April 9, 1935.  H. W. KNIFFEN ET AL  1,997,301

FEED MIXER

Filed June 18, 1934  2 Sheets-Sheet 1

INVENTORS,
Hiram Wilbur Kniffen, Deceased.
Meta A. Kniffen, Executrix.
William Thomas Crackel.
By
ATTORNEYS April 9, 1935.  H. W. KNIFFEN ET AL  1,997,301
FEED MIXER
Filed June 18, 1934   2 Sheets-Sheet 2
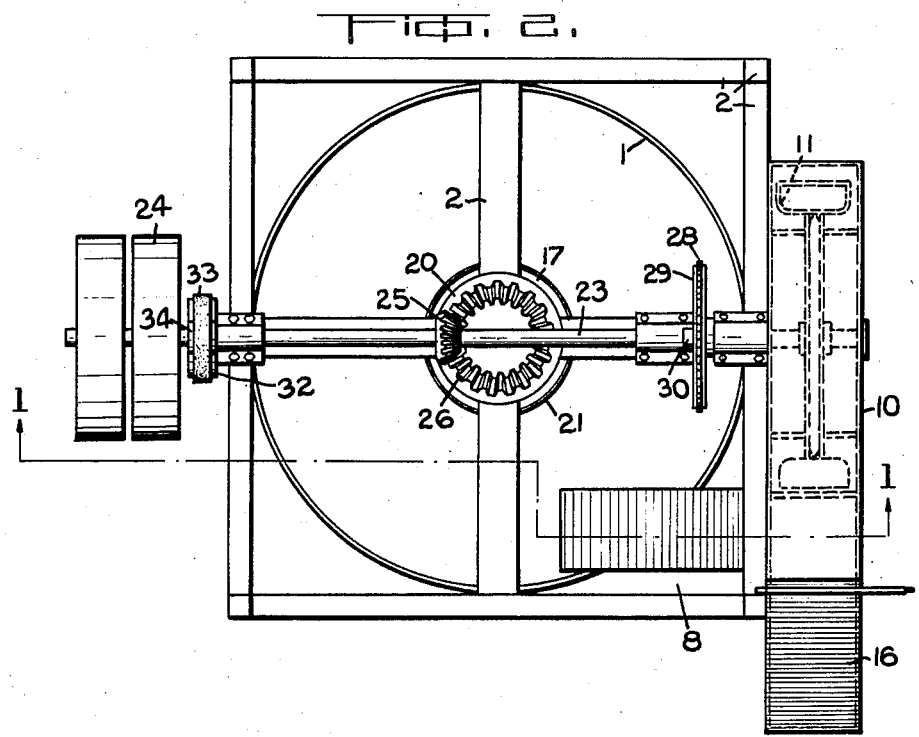
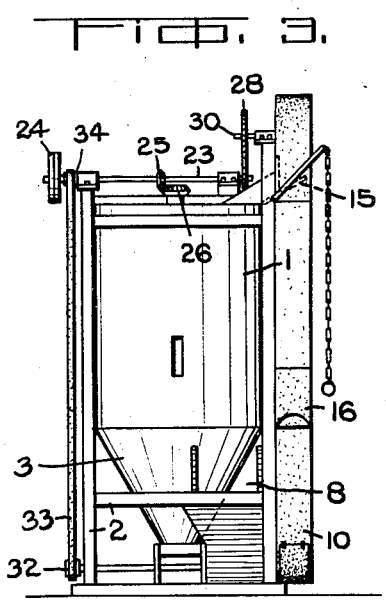
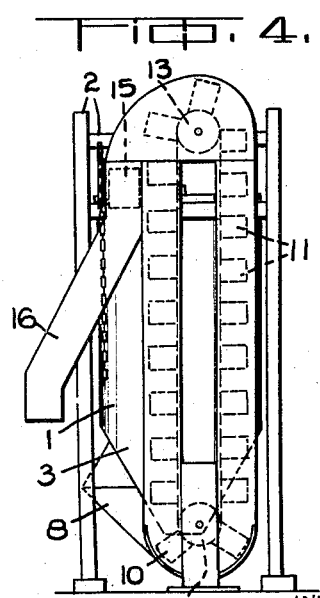
INVENTORS.
Hiram Wilbur Kniffen, Deceased.
Meta A. Kniffen, Executrix.
William Thomas Crackel.
By Fetherstonhaugh & Co
ATTORNEYS Patented Apr. 9, 1935

1,997,301

UNITED STATES PATENT OFFICE 1,997,301

FEED MIXER

Hiram Wilbur Kniffen, deceased, late of Chatham, Ontario, Canada, by Meta A. Kniffen, executrix, Chatham, Ontario, Canada, and William Thomas Crackel, Chatham, Ontario, Canada; said Crackel assignor to said Meta A. Kniffen Application June 18, 1934, Serial No. 731,081
In Canada June 20, 1933

2 Claims. (Cl. 259—8)

The invention relates to improvements in feed mixers, and the object of the invention is to devise a mixer particularly intended for poultry and stock feeds which will thoroughly mix the different grains or ingredients employed therein.

A further object is to devise an apparatus in which the respective ingredients can be conveniently dumped into an inlet and after mixing the feed will be discharged from an outlet conveniently disposed above a bag or other receptacle employed for conveying or storing the feed.

A still further object is to construct an apparatus which will be simple in construction and operation and can be operated from any suitable power source.

With the above and other objects in view which will hereinafter appear the invention consists, in its preferred embodiment, of the construction all as hereinafter more particularly described and illustrated in the accompanying drawings in which:—

Fig. 2 is a plan view.

Fig. 3 is a front elevation drawn to a reduced scale, and

Fig. 4 is a side elevation also drawn to a reduced scale.

Like characters of reference indicate corresponding parts in each figure.

Figure 1:
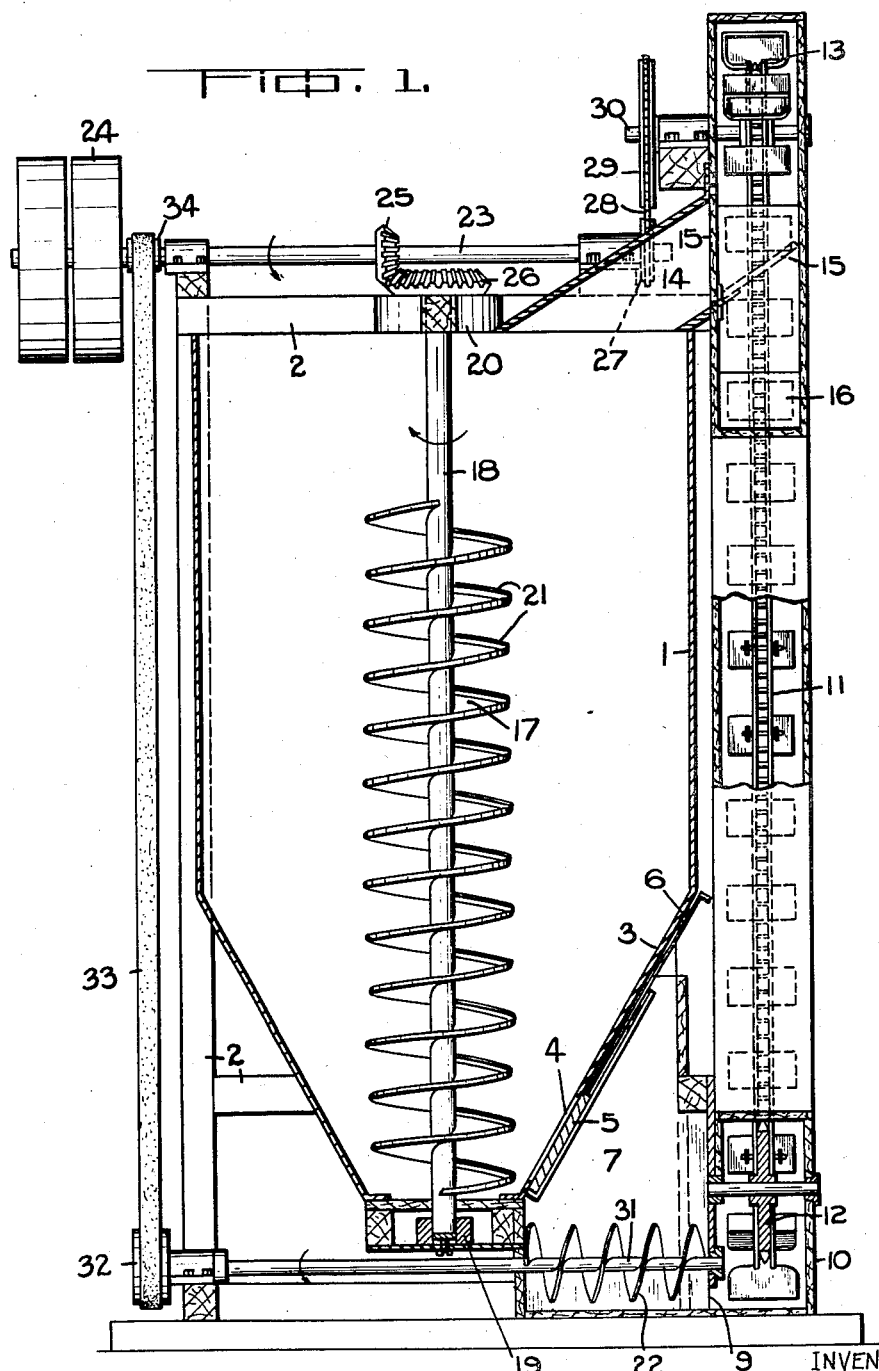
Fig. 1 represents a vertical section therethrough.

A mixing tank 1 is preferably supported in an upright position in a frame 2 and such tank has preferably an inverted truncated conical lower portion 3 with an outlet 4 therein normally closed by a gate valve 5 adapted to be hand operated by means of a rod 6.

The outlet 4 communicates with a horizontal screw conveyor compartment 7, also provided with an ingredient inlet orifice 8 through which the grain and/or other ingredients of the feed are inserted into such compartment 7. The latter has also an outlet orifice 9 communicating with the interior of a vertical endless conveyor casing 10 which casing contains, as illustrated, an endless bucket conveyor 11 extending over lower and upper suitably journalled sprockets 12 and 13 respectively. A chute 14 establishes communication between the conveyor casing 10 in the vicinity of its upper end and the mixing tank 1 and the inlet of such chute is provided with a flap valve 15 adapted alternatively, depending upon its position, to permit the ingredients from the endless conveyor to be discharged through the chute into the mixing tank or the mixed feed to be discharged through the outlet chute 16 which, as is illustrated, is disposed in offset relation to the endless conveyor casing 10.

The mixing tank 1 is provided with a vertical screw conveyor 17 having its shaft 18 stepped into a suitable lower bearing 19. The upper shaft bearing 20 is preferably mounted on the frame 2. The peripheral edge of this screw conveyor has preferably an upturned flange 21 to prevent the material being displaced from the conveyor under the influence of any centrifugal force that may occur in rotating the same.

A horizontal screw conveyor 22 is rotatably mounted in the compartment 7 for impelling the material therein through the outlet orifice 9 into the casing 10.

The preferable form of drive for the respective conveyors is by means of a suitable cross shaft 23 journalled on the frame 2 and provided at one end with pulleys 24 by means of which it may be driven from any source of power, one of the pulleys being an idler. A bevelled pinion 25 secured to the cross shaft 23 meshes with a crown gear 26 on the upper end of the screw conveyor shaft 18, and a sprocket wheel 27 also secured to such shaft 23 is connected by a chain 28 to a sprocket wheel 29 secured to the shaft 30 upon which the endless conveyor sprocket 13 is mounted.

The shaft 31 of the horizontal screw conveyor 22 is prolonged and provided with a pulley 32 which is connected by a belt 33 with a pulley 34 secured to the cross shaft 23.

In the vicinity of the lower end of the vertical screw conveyor 17 there is preferably provided an upwardly extending fin or wing secured to the conveyor and having its upper part inclined to correspond with the inclination of the conical lower portion 3 of the tank 1. Such fin has also the forward edge of its upper portion nearer the portion 3 than its rear end. The purpose is to force the ingredients of the feed mix away from the tank into the conveyor and at the same time it acts as an agitator for helping the circulation and mixing of the feed in the tank.

The apparatus operates as follows:—

The ingredients employed to constitute the desired feed are dumped into the compartment 7 through the inlet orifice 8, and assuming that the drive is functioning such ingredients are impelled by the screw conveyor 22 through the outlet orifice 9 into the endless conveyor casing 10 where they are elevated on the buckets of the endless conveyor until they reach the top thereof, the flap valve 15 being in such position that the passage to the chute 16 is closed (as indicated in dotted lines Fig. 1) and such ingredients are deflected by such valve down the chute 14 into the mixing tank 1 wherein they fall to the bottom thereof. They are picked up by the screw conveyor 17 and elevated to the top thereof again falling to the bottom of the tank when the operation is repeated again and again until the ingredients have been thoroughly mixed together. During such operation the gate valve 5 in the conical lower portion of the tank is closed.

When the feed has been mixed the required extent the gate valve 5 is opened and the feed falls into the compartment 7 where it is again impelled by the screw conveyor 22 through the orifice 9 where it is picked up by the buckets of the endless conveyor 11 and elevated. The flap valve 15 is swung into the position illustrated in full lines in Fig. 1 wherein the mixed feed is now discharged through the outlet chute 16 into a bag or other receptacle placed below the the same.

From the above description it will be apparent that there has been devised a feed mixed that will thoroughly mix together the several ingredients of the feed and which will be easy to operate as well as require no manual handling to achieve the desired end.

What is claimed as the invention is:

1. In a feed mixer, in combination, a mixing tank, a feed ingredient and mixed feed receiving compartment in communication with the mixing tank, said compartment having an open mouth for receiving the feed ingredients from exteriorly of the machine, a movable closure for closing the communication between the mixing tank and the compartment during the period the feed ingredients are being mixed in the tank, an elevator in communication with the tank for alternatively elevating the feed ingredients and the mixed feed, a discharge chute for the mixed feed, means for alternatively receiving the feed ingredients and the mixed feed into the elevator from the compartment, and selective means for alternatively establishing communication between the elevator and the mixing tank and between the elevator and the discharge chute for discharging the feed ingredients from the elevator in the mixing tank and the mixed feed from the elevator into the discharge chute.

2. In a feed mixer as claimed in claim 1, a conveyor for alternatively delivering the feed ingredients and the mixed feed from the compartment to the elevator.

META A. KNIFFEN,
*Executrix of the Estate of Hiram Wilbur Kniffen, Deceased.*
WILLIAM THOMAS CRACKEL.